United States Patent

[11] 3,569,615

[72] Inventors Peter E. R. Oberbeck; Wolfgang J. Poppelbaum, Urbana, Ill.
[21] Appl. No. 750,789
[22] Filed Aug. 7, 1968
[45] Patented Mar. 9, 1971
[73] Assignee The United States of America as represented by the United States Atomic Energy Commission

[54] METHOD AND APPARATUS FOR TRANSMITTING VIDEO INFORMATION WITH AMPLITUDE REPRESENTATION OF POSITION INFORMATION
6 Claims, 6 Drawing Figs.

[52] U.S. Cl. .......... 178/6, 178/6.8, 325/38, 325/141, 328/130
[51] Int. Cl. .......... H04n 1/02, H04n 1/40, H04n 7/12
[50] Field of Search .......... 178/6 (BWR), 6.8; 325/38, 141; 328/129, 130

[56] References Cited

UNITED STATES PATENTS

| | | | |
|---|---|---|---|
| 3,286,200 | 11/1966 | Foulger | 325/141 |
| 3,404,344 | 10/1968 | Riddle | 328/129 |
| 3,470,325 | 9/1969 | Frohbach | 178/6 |
| 3,484,703 | 12/1969 | Thieberger | 328/129 |

*Primary Examiner*—Bernard Konick
*Assistant Examiner*—Howard W. Britton
*Attorney*—Roland A. Anderson

ABSTRACT: An encoding method and apparatus for transmitting sequences of video pulses produced by a television camera scanning graphic information of limited complexity, such as a line drawing, over a transmission medium having limited bandwidth, include encoding the time interval between video pulses into a voltage level having a predetermined time duration and having an amplitude proportional to the time interval between video pulses, transmitting the voltage levels, and decoding the voltage levels into the original sequence of video pulses.

Inventors
Peter E.R. Oberbeck
Wolfgang J. Poppelbaum
Attorney

Inventors
Peter E.R. Oberbeck
Wolfgang J. Poppelbaum

Attorney

Inventors
Peter E. R. Oberbeck
Wolfgang J. Poppelbaum
Attorney

PATENTED MAR 9 1971

3,569,615

Inventors
Peter E.R. Oberbeck
Wolfgang J. Poppelbaum
Attorney

METHOD AND APPARATUS FOR TRANSMITTING VIDEO INFORMATION WITH AMPLITUDE REPRESENTATION OF POSITION INFORMATION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to encoding methods and apparatus for the transmission of pictorial information, particularly to methods and apparatus for the transmission of graphic information, such as a line drawing, over a medium having limited bandwidth.

Currently, U.S. standards for conventional television transmission set a requirement of about 4.2mc. for the transmission bandwidth. This 4.2mc. bandwidth is used regardless of the complexity of the picture to be transmitted. In certain applications, however, the picture information to be transmitted is of limited complexity. Such type of picture information is, for example, present in certain types of computer generated line drawings. Since the complexity of such line drawings is small as compared to that of the usual commercial television pictures, it would be advantageous if the bandwidth requirements for the transmission of such line drawings could be reduced accordingly.

It is therefore an object of the present invention to provide a method for reducing the transmission bandwidth for pictorial information of limited complexity.

It is another object of the present invention to provide a method for encoding a signal, representative of a line drawing to be transmitted, into another signal which can be transmitted over a transmission medium having a limited bandwidth.

It is yet another object of the present invention to provide an apparatus for encoding a video signal representative of pictorial information of limited complexity for transmission over a medium having limited bandwidth.

It is still another object of the present invention to provide an apparatus for encoding and transmitting the time between video pulses representative of pictorial information of limited complexity into a sequence of voltage levels having equal time durations an having an amplitude representative of the time durations between video pulses.

SUMMARY OF THE INVENTION

In accordance with the invention, a television pickup camera scans the optical image of a line drawing within a frame and produces a video output pulse when a scan intersects a line of the line drawing. Each video pulse stops a counter of a plurality of counters receiving clock pulses since the beginning of a scan. The count in each counter is thus representative of the time duration between video pulses. The contents of the counters are converted into analogue form, thereby producing a sequence of voltage levels having magnitudes representative of the time durations between video pulses. Each voltage level has the same time duration which may be adjusted to allow transmission of the voltage levels over a lower bandwidth medium than would be possible for the transmission of the video output pulse signal, since the time duration between video pulses may be very small indicating a high frequency content in the video output pulse signal. After transmission, the voltage levels are converted to their digital representation and stored in a plurality of registers. The contents of each register is then compared with the contents of a counter which is being advanced at the same rate as the plurality of counters used in the encoding of the video output pulse signal. Upon equality between the contents of a register and the counter, an unblank pulse is generated which plots one point on the display screen of a display device running in synchrony with the scanning TV pickup camera. After a full frame has been received and decoded, the plotted points on the screen of the display device, thus corresponding to intersections of the scans with the lines of a line drawing, constitute the transmitted line drawing.

BRIEF DESCRIPTION OF THE DRAWINGS

A more complete understanding of the invention will best be obtained from consideration of the accompanying drawings in which.

PREFERRED EMBODIMENT OF THE INVENTION

Figure 1:
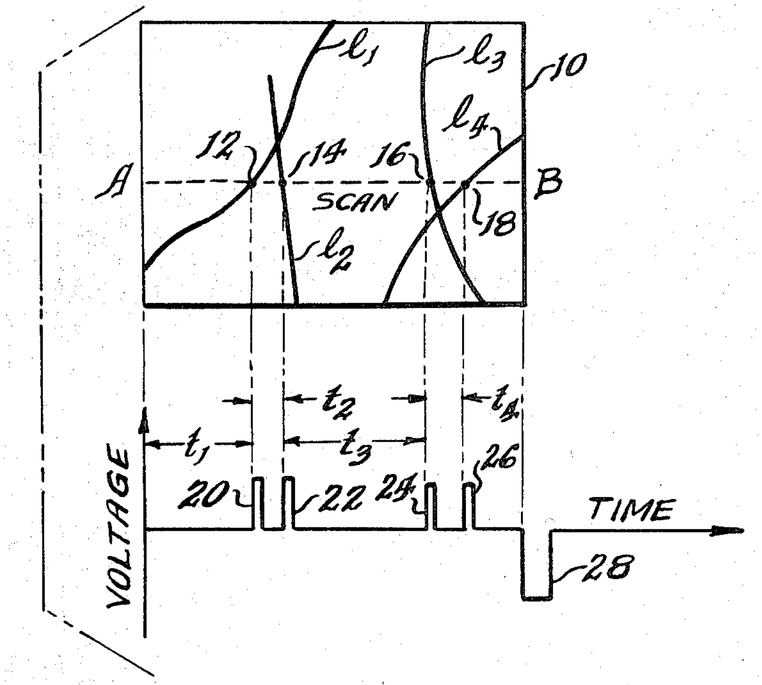
FIG. 1 shows a line drawing to be transmitted and the pulse output of a television camera scanning the line drawing along a horizontal line AB.

Referring to the upper portion of FIG. 1, there is shown a line drawing bounded by closed line 10, defining a frame. It is desired to transmit this graphical information to a distant receiving station employing a television transmission system which requires a bandwidth much smaller than that used in conventional television transmission systems. Depending on the particular resolution desired, a television camera will scan the line drawing within the closed line 10 along a predetermined number of equally spaced horizontal scans and according to standard video practice of left-to-right top-to-bottom scanning. One such horizontal scan is illustrated in FIG. 1 by the horizontal line AB. Each time a scan intersects a line of the line drawing, a pulse is produced by the television camera. Thus in the line drawing of FIG. 1 comprising lines $l_1$, $l_2$, $l_3$ and $l_4$, four pulses will be generated by a television camera scanning along the line AB.

The lower portion of FIG. 1 is a sequence of pulses representing the output of a television camera scanning the line drawing of FIG. 1 along the line AB. Synchronization pulse 28 is added to the video output to mark the end of the scan. The pulses 20, 22, 24 and 26 are produced in response to the intersection of the scan along the line AB with the lines $l_1$, $l_2$, $l_3$, and $l_4$, respectively. The scan along the line AB starts at point A and proceeds toward point B. The time duration between the beginning of the scan along the line AB and the intersection with the line $l_1$ of the line drawing of FIG. 1 is labeled $t_1$ Similarly, the time durations between the scan intersections with lines $l_1$ and $l_2$, $l_2$ and $l_3$, $l_3$ and $l_4$ are labeled $t_2$, $t_3$ and $t_4$, respectively.

If a sequence of pulses are to be transmitted over a medium allowing a maximum pulse transmission rate $R$, corresponding to a time separation $T$ between pulses, then pulses which are separated by a time duration $t < T$ will be lost in the transmission. If, for example, the sequence of pulses 20, 22, 24 and 26 are to be transmitted over a medium allowing a maximum pulse transmission rate $R$, or, in other words, a minimum pulse separation $1/R = T$, and $t_2$ and $t_4$ are less than $T$, then pulses 22 and 26 will be lost in the transmission thereof.

Figure 2:
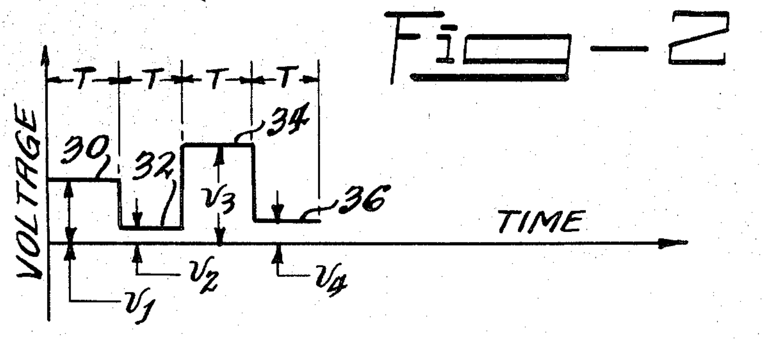
FIG. 2 is a first encoded representation of the sequence of pulses in FIG. 1 according to the present method of the invention.

FIG. 2 is a first encoded representation of the sequence of pulses in FIG. 1 according to the encoding method of the present invention. In general, the encoding method may be described as follows. The time occurrence of a pulse in a sequence of pulses is converted into a voltage level having a predetermined time duration and having an amplitude proportional to the time duration between a pulse and the immediately preceding pulse. In particular, $t_1$ in FIG. 1 is converted into a voltage level 30 in FIG. 2 having an amplitude $V_1$ proportional to the time duration $t_1$ between pulse 20 and the start of the scan at point A; $t_2$ in FIG. 1 is converted into a voltage level 32 in FIG. 2 having an amplitude $V_2$ proportional to the time duration $t_2$ between pulse 20 and pulse 22. Similarly, $t_3$ and $t_4$ in FIG. 1 are converted into voltage levels 34 and 36, respectively, having amplitudes $V_3$ and $V_4$. Each of the voltage levels 30, 32, 34 and 36 have the same time duration $T$, where $T$ is the minimum time duration for transmission of these voltage levels within the bandwidth of the transmission medium being used.

Figure 3:
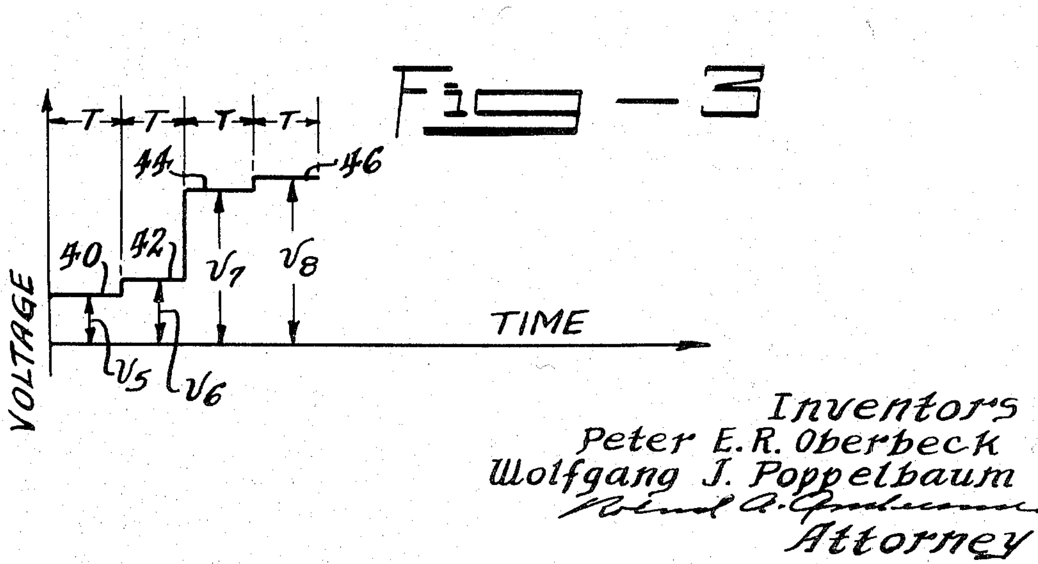
FIG. 3 is an alternate and preferred encoded representation of the sequence of pulses in FIG. 1 according to the present method of the invention.

FIG. 3 is a second encoded representation of the time occurrence of the video pulses 20, 22, 24 and 26 in FIG. 1 according to the method of the present invention. Again time duration $t_1$ is converted into a voltage level 40 having an amplitude $V_5$ *proportional to the time duration* $t_1$. The occurrence of pulse 22 is now, however, measured from the beginning of the scan at point A. Thus, pulse 22 is converted into a voltage level 42 having an amplitude $V_6$ proportional to $(t_1 + t_2)$. Similarly, the time occurrences of pulses 24 and 26 are respectively encoded into voltage levels 44 and 46, having amplitudes $V_7$ and $V_8$, where $V_7$ is proportional to $(t_1 + t_2 + t_3)$, and $V_8$ is proportional to $(t_1 + t_2 + t_3 + t_4)$. Each of the voltage levels 40, 42, 44 and 46 again have the same time duration, $T$, corresponding to the maximum transmission rate of these voltage levels within the bandwidth of the particular transmission medium used.

For purposes of further detailed description it is assumed that the complexity of the line drawings is such that the number of intersections of each scan with the lines of the line drawings will not exceed the number N.

Figure 4:
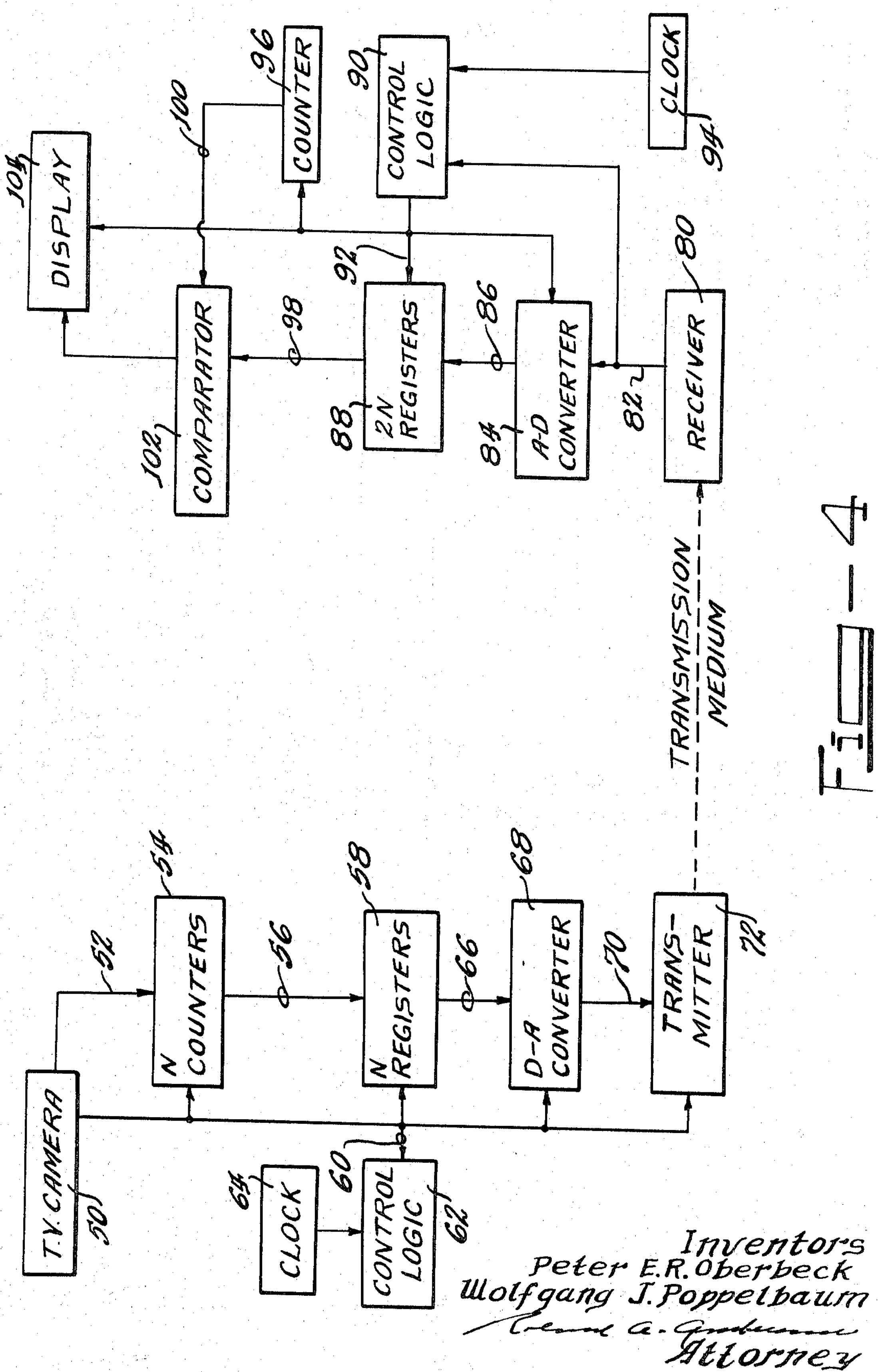
FIG. 4 is a functional block diagram of a preferred embodiment of the apparatus for the practice of the present invention.

Referring now to FIG. 4, in the encoder-transmitter section of the apparatus, a conventional television pickup camera 50, scanning a graphical display, such as the line drawing in FIG. 1, along predetermined equally-spaced horizontal scans, has its video output 52 connected to inputs of each of N counters 54. A control logic circuit 62 connected to the output of a clock 64 controls and distributes clock pulses and control pulses, via a set of control lines 60, to the television pickup camera 50, the N counters 54, a set of N registers 58, a digital-to-analog (D–A) converter 68, and a transmitter 72. Each output of the N counters is connected, via a set of parallel lines 56, to the input of one of the N registers 58. Each output of the N registers 58 may, in turn, be connected to the input of the digital-to-analog converter 68, via a set of parallel lines 66. The output 70 of the digital-to-analog converter 68 is connected to the input of conventional transmitter 72. Synchronization pulses from the control logic 62 are added to the digital-to-analog converter output in the transmitter, via a line of control lines 60.

In the receiver-decoder section of the apparatus, a conventional receiver 80 has its output connected to the input of a conventional analog-to-digital (A–D) converter 84 and to control logic 90. The output of a clock 94, which generates clock pulses at the same rate as the clock 64 in the encoder-transmitter section, is connected to control logic 90. A set of parallel lines 86 connect the analog-to-digital converter output to the input of each of the 2N registers 88. One line of a set of lines 92, interconnecting control logic 90 and the 2N registers 88, controls the gating of the analog-to-digital output into the registers 88 according to a predetermined sequence. The output of each of the 2N registers 88 may, in turn, be connected, via lines 98, to a first set of inputs of a conventional comparator 102. A second set of inputs to comparator 102 is connected to the output of a binary counter 96 which is being advanced by clock pulses from control logic 90, via a line of set of lines 92. The output of comparator 102 is connected to a conventional display, such as a CRT display. Positioning of the display is under control of control logic 90, via a line of lines 92.

In operation, a predetermined time interval after receipt of synchronization pulse, indicating the beginning of a scan by the television pickup camera 50, clock pulses from the control logic 62 begin advancing each of the N counters 54. When the scan intersects a line of the line drawing, a video pulse is produced which inhibits the first counter of the N counters 54 for the remainder of the scan. When the scan intersects a second line of the line drawing, another pulse is produced by the television pickup camera 50 which inhibits the second counter of the N counters 54 for the remainder of the scan. Similarly, successive intersections of the scan with lines in the line drawing inhibit successive counters of the N counters 54 for the remainder of the scan. The time interval between successive video pulses is thus converted into digital numbers representative thereof. At the end of the scan, the control logic 62 transfers an end of scan synchronization pulse to the transmitter 72. In response to the end of scan synchronization pulse the control logic 62 produces a pulse which transfers the contents of the N counters 54 to the N registers 58 via the set of lines 56. A predetermined time interval after the end of synchronization pulse, the next scan begins.

During each scan N pulses, separated by equal time intervals $T$, are generated by the control logic circuit 62 to control the transfer of the contents of each of the N registers 58 to the digital-to-analog converter 68 input. Thus the first pulse of the N equally-spaced pulses transfers the contents of the first register of the N registers 58 to the digital-to-analog converter input and activates the digital-to-analog converter to convert the digital input to analogue form. Similarly, the contents of the second and higher order registers are successively transferred to the digital-to-analog converter input and converted into analogue voltage levels representative thereof. The output of the digital-to-analog converter 68 is coupled to the transmitter 72. The time duration of each of the N equally-spaced pulses which transfer the contents of the N registers 58 to the digital-to-analog converter input is adjusted such that the maximum allowable transmission rate of the transmission medium is obtained.

The encoder-transmitter section of the apparatus thus converts the time occurrence of video pulses, representative of scan intersections with lines of the line drawing to be transmitted, into a sequence of voltage levels having a magnitude proportional to the time interval between video pulses and having equal time durations $T$.

Control (sync) pulses from control logic 62 are added to the encoded signal between the sequences of voltage levels to insure proper synchronization between the encoder-transmitter and the decoder-receiver sections of the apparatus.

The transmission medium or path between transmitter and receiver has limited bandwidth and may be coaxial cable.

Receiver 80 transfers the control pulses in the transmitted signal to control logic 90. Responsive to the control pulses from receiver 80, control logic 90 generates N pulses, spaced at the same time interval, $T$, as the N equally-spaced pulses generated in the encoder-transmitter section. Each of the N equally-spaced pulses produce an analog-to-digital conversion of the incoming voltage levels. The N converted voltage levels are stored in a first set of N registers of the 2N registers 88. During the conversion and storing of one scan of transmitted signals, encoded information received during the previously transmitted scan and stored in a second set of N registers of the 2N registers 88 is further decoded and displayed on display 104. Thus, although the transmission of the encoded information occurs in real time, the display 104 is one scan behind the television pickup camera in reconstructing the transmitted line drawing. The contents of each of the second set of N registers are successively compared with the contents of counter 96 which is being advanced at the same rate as each of the N counters 54 in the encoder-transmitter section. Upon equality between the contents of a register and the contents of counter 96, the comparator 102 issues a pulse which unblanks the display 104, thereby plotting a point on the screen of the display. The display 104 is made to sweep horizontally across the display screen in the same time as the time which is required for the television pickup camera to make one horizontal scan across the frame containing the line drawing to be transmitted. Since each sweep of the display 104 is synchronized with each scan of the television pickup camera 50, each point on the display screen produced by the output of comparator 102 corresponds to an intersection of a scan with a line of the line drawing being transmitted. After a full frame has been received and decoded, the transmitted line drawing is thus reconstructed by the displayed points on the display screen.

Figure 5:
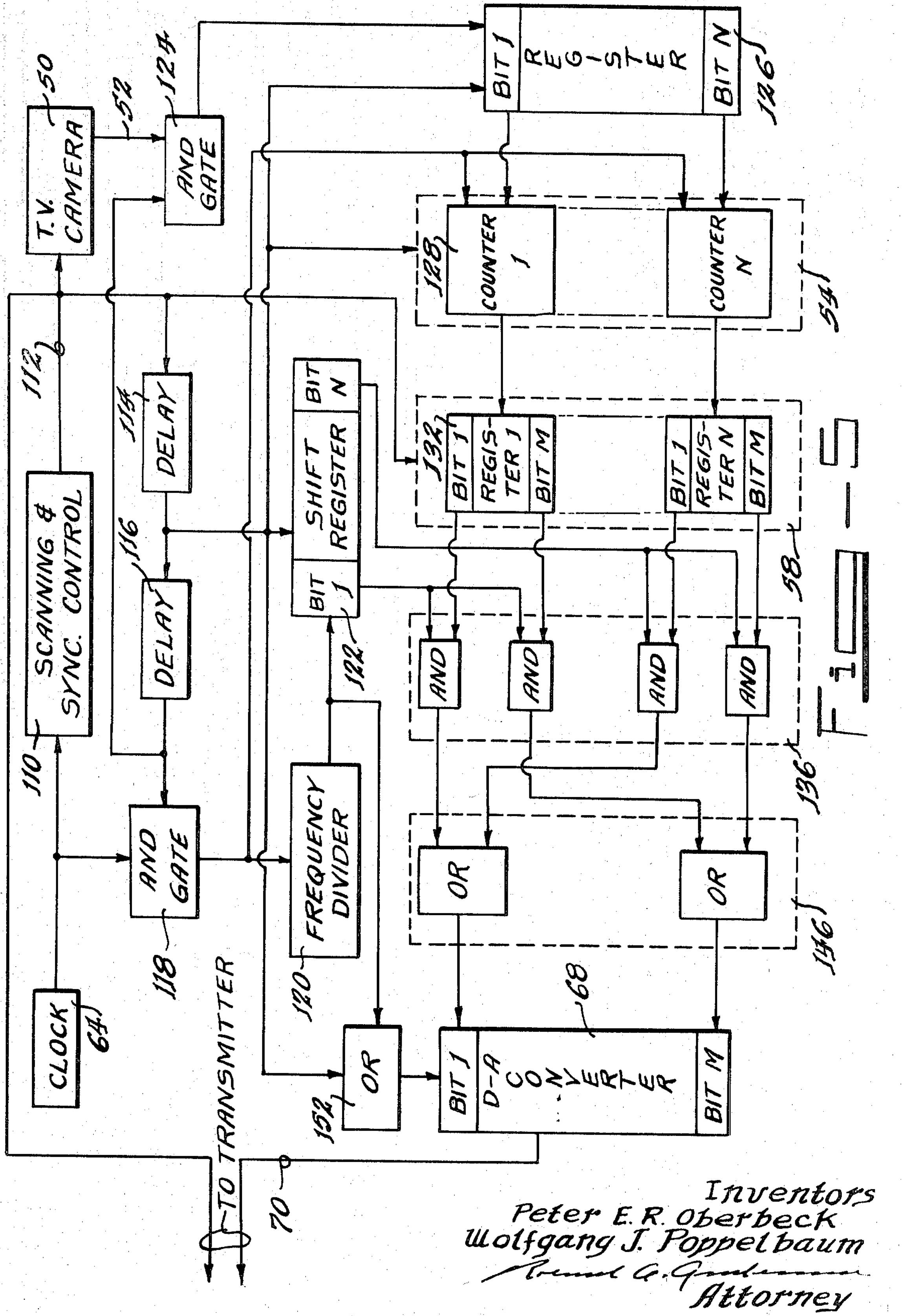
FIG. 5 is a more detailed block diagram of the encoder section of the apparatus depicted in FIG. 4 for the practice of the encoding method illustrated in FIG. 3.

Referring now to FIG. 5, which is a more detailed block diagram of the encoder in the encoder-transmitter section of the apparatus for the practice of the encoding method illustrating in FIG. 3, the output of a conventional clock is connected to a scanning and sync control 110, which, via lines of set of lines 112, controls the horizontal and vertical deflection of a television pickup camera 50 and issues synchronization pulses marking the end of each scan, such as the pulse 28 in FIG. 1, and synchronization pulses marking the end of a completely scanned frame. The output of the clock 64 is also connected to a first input of a conventional AND gate 118. A line of set of lines 112 carrying synchronization pulses marking the end of each scan is connected to the input of an adjustable time delay 114 and to gating inputs of transfer gates (not shown) coupling the outputs of each of N counters, illustrated as a dashed block having reference number 54, to the inputs of N registers illustrated as a dashed block having reference number 58. In addition, the synchronization pulses from the scanning and sync control 110 are coupled to the transmitter 72 in FIG. 4 where they are added to the encoded video signals for control of the display 104 in the decoder-receiver section of the present apparatus.

The delay 114, such as a monostable multivibrator, is adjusted to provide a time delay between its input and output signal equal to the time interval between the end of a scan and the beginning of the next succeeding scan. The output of the delay 144 is connected to the input of another adjustable time delay 116, present inputs of an N-stage shift register 122 and an N-stage control register 126, a clear input of each of the N counters 54, and a first input of an OR gate 152.

The delay 116, such as a monostable multivibrator, is adjusted to provide a time delay equal to the time which is required to make one scan, such as, for example, the time required to scan along the line AB IN FIG. 1. The output of the delay 116 is connected to second inputs of AND gate 118 and AND gate 124. Both AND gates 118 and 124 are enabled during the delay time of delay 116, allowing AND gate 118 to pass clock pulses and allowing AND gate 124 to pass video output pulses from the television pickup camera which has its video outputs connected to a first input of AND gate 124.

The output of AND gate 118 is connected to the count input of each of the counters 54 and to an adjustable frequency divider 120, such as a binary counter, which, responsive to clock pulses from clock 64, may be set to produce a predetermined number of output pulses during the delay time of the delay 116, or, equivalently, during the time required to make one scan. The output of frequency divider 120 is connected to a second input of OR gates 152 and to a shift control input of shift register 122.

Shift register 122 comprises N ordered binary stages, which, together with frequency divider 120, control the time duration of the voltage levels representing the time interval between video pulses. The set output of each stage of the ordered stages of shift register 122 is connected to a first input of a set of M AND gates having the same order of NM ordered AND gates illustrated as a dashed block having reference numeral 136.

The output of AND gate 124 is connected to the input of the control register 126. Control register 126 comprises N ordered binary stages which control the conversion of the time durations between video pulses into equivalent binary numbers. The set output of each stage of the ordered stages of control register 126 is connected to a control input of a counter having the same order of the N ordered counters 54.

Each stage of the control register 126 which is in the set state enables the count input of the counter to which it is connected, thus allowing clock pulses from clock 64, via AND gate 118, to advance only those counters which have an enabled count input.

Each counter of the N counters 54 comprises M binary stages. The binary outputs of each counter of the ordered counters 54 are connected in parallel to inputs of a register having the same order of the N ORDERED registers 58 via the transfer gates (not shown) interconnecting counters 54 and registers 58. The synchronization pulse marking the end of each scan transfers the contents of the counters 54 to the registers 58 via the enabling inputs of the registers 58.

Each of the registers 58 comprises M ordered binary stages having their set outputs connected to second inputs of a set of M AND gates having the same order of the NM ordered AND gates 136.

The outputs of AND gates 136, which have an input connected to register stages of registers 58 of the same order are connected to the input of a common OR gate of M OR gates illustrated as a dashed block having reference numeral 146.

The outputs of the OR gates 146 are connected to the inputs of digital-to-analog (D–A) converter 68, which converts the binary inputs from the registers 58 into analogue form in response to an output of OR gate 152. The output of the digital-to-analog converter 68 is connected to the transmitter 72 in FIG. 3.

Before operation of the encoder, and assuming that the complexity of the line drawing to be transmitted is such that for each scan the maximum number of video output pulses is N or less, the frequency divider 120 is adjusted to produce N equally-spaced output pulses during the delay time of the delay 116.

In operation, scanning and sync control 110 receiving clock pulses from the clock 64, activates the television pickup camera to scan the line drawing to be transmitted. After each scan, scanning and sync control 110 issues a synchronization pulse which is coupled to the input of the delay 114 and which transfers the contents of the counters 54 to the registers 58, via the transfer gates (not shown) interconnecting counters 54 and registers 58. The output pulse of delay 114 sets the lowest order stage (bit 1) of the shift register 122 to the set state, sets each of the N stages of the control register 126 to the set state, clears each of the N counters 54, and triggers the delay 116. AND gates 118 and 124, being enabled during the time delay of the delay 116, respectively pass clock pulses and video pulses to the frequency divider 120 and the control register 126. In addition, clock pulses advance each of the N counters 54, via AND gate 118, since each of the N stages of the shift register 126 are in the set state thus enabling the inputs of the counters 54. The first video pulse from the television pickup camera 50 during a scan passes enabled AND gate 124 and triggers the lowest order stage (bit 1) of the control register 126 to the reset state thereby disabling the input to the first counter 128 of the N counters 54. Thus, the content of counter 128 represents the time duration between the beginning of a scan and the occurrence of the first intersection of the scan with a line of the line drawing. The second video pulse during a scan, again passes enabled AND gate 124 and triggers the second stage (bit 2) of the control register 126 to the reset state, leaving the lowest order stage (bit 1) in the reset state, thereby disabling the clock pulse input to the second counter of the N counters 54. Thus, the contents of the second counter represents the time duration between the beginning of the scan and the occurrence of the second intersection of the scan with a line of the line drawing in accordance with the present encoding method as illustrated in FIG. 3. Similarly, subsequently occurring video pulses trigger higher order stages of the control register 126 to the reset state, thereby disabling correspondingly higher order counters 54. At the end of the time delay of the delay 116, marking the end of a scan, AND gates 118 and 124 are disabled by the delay 116.

During the encoding of the time intervals between video pulses occurring in a scan, the encoded time intervals between video pulses of the preceding scan in registers 58 are converted to an analogue representation under control of the shift register 122. The lowest order stage (bit 1) of the shift register 122, being triggered to the set state by the output pulse of delay 114, partially enables the first M AND gates of the AND gates 136. Each stage of the first register 132 of the N registers 58 which is in the set state fully enables the AND gate to which it is connected. Each fully enabled AND gate, in turn, produces an output which, via an OR gate 146, is coupled to the input of digital-to-analog converter 68. Each stage of first register 132 of the N registers 58 which is in the reset state produces no output of its associated AND gate of the first M AND gates. Thus, the lowest order stage (bit 1) of the shift register 122 being in the set state enables the transfer of the binary number in the first register 132 of the N registers 58 to the input of digital-to-analog converter 68 which converts the input binary number to a voltage level representative thereof in response to the output of delay 114, via OR gate 152. The first of the N equally-spaced output pulses of the frequency divider 120 shifts the binary "one" in the lowest order stage of the shift register 122 into the second stage, thereby enabling the transfer of the binary number in the second register of the N registers 58 to the input of the digital-to-analog converter 68, which, upon receiving the first output of the frequency divider 120, via OR gate 152, converts the input binary number to analogue form. Similarly, each of the binary numbers in the remaining registers 58 are successively converted into representative voltage levels, having the same time durations, in response to the equally-spaced output pulses of frequency divider 120.

The encoded representation of the time duration between video pulses in accordance with the representation illustrated in FIG. 2 may be obtained by replacing control register 126 with an N-stage shift register similar to shift register 122. A binary "one" being shifted in the shift register in response to video pulses then enables the count input of successively higher order counters 54 only for the time duration between video pulses, thereby achieving the encoded representation illustrated in FIG. 2.

Figure 6:
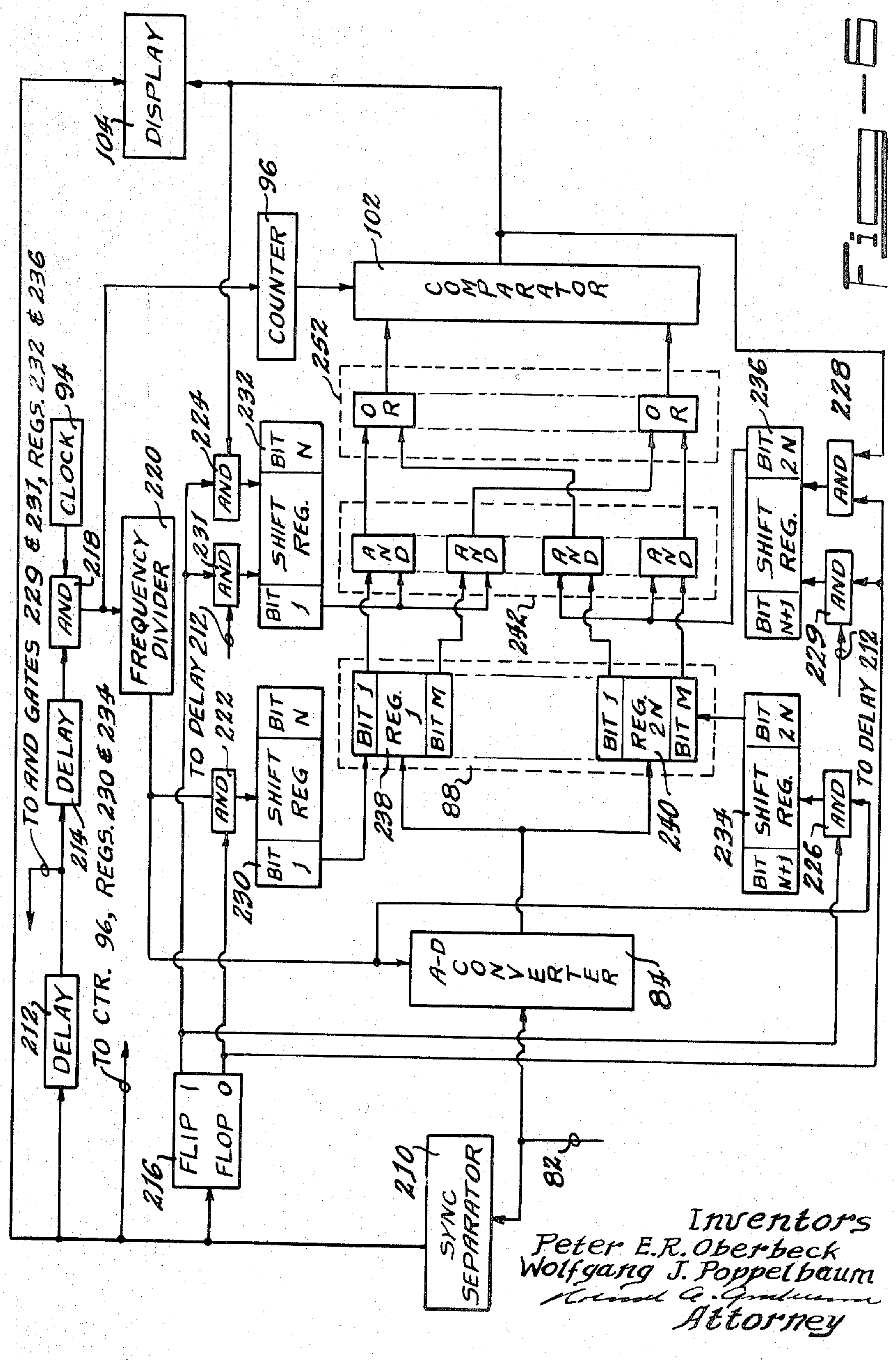
FIG. 6 is a more detailed block diagram of the decoder section of the apparatus depicted in FIG. 4 for the practice of the invention illustrated in FIG. 3.

Referring now to FIG. 6, which is a more detailed logical diagram of the decoder in the decoder-receiver section of the present device for the practice of the method of the present invention illustrated in FIG. 3, input line 82, carrying encoded video information and synchronization pulses, interconnects the output of the receiver 80 in FIG. 4 and the inputs of conventional analog-to-digital converter 84 and sync separator 210. Sync separator 210 detects and passes the horizontal and vertical synchronization pulses from the incoming signal on line 82. The output of sync separator 210 is connected to a clear input of shift registers 230 and 234 and the counter 96, and display 104, such as a conventional CRT display, for controlling and synchronizing the horizontal and vertical positioning of the transmitted line drawing. The output of sync separator 210 is also applied to the toggle input of a conventional bistable multivibrator (flip-flop) 216, and to the input of an adjustable time delay 212, which is similar in construction to the delay 114 in FIG. 4, but is adjusted to provide a time delay such that each analog-to-digital conversion occurs near the middle of the time duration of each input voltage level representing encoded video information. The output of delay 212 is connected to the input of another adjustable time delay 214, preset inputs (not shown) of conventional shift registers 232 and 236, and first inputs of AND gates 229 and 231.

The delay 214, which is similar in construction to the delay 116 in FIG. 5, is adjusted to provide the same time delay as the delay 116 in FIG. 5. The output of delay 214 is connected to a first input of a conventional AND gate 218. The delay 214 supplies an enable level to the AND gate 218 upon being triggered by the output of delay 212 and for a time duration equal to its time delay. The output of conventional clock 94, which generates clock pulses at the same rate as the clock 64 in FIG. 5, is connected to a second input of AND gate 218. The output of AND gate 218, constituting clock pulses from the clock 94 during the time delay of delay 214, are coupled to the input of counter 96, and the input of a conventional frequency divider 220, which is similar to the frequency divider 120 in FIG. 5 and which is adjusted to produce an output pulse in response to the same number of input clock pulses as frequency divider 120 in FIG. 5. Since both clocks 64 and 94 generate clock pulses at the same rate, both frequency dividers 120 and 220 in FIGS. 5 and 6, respectively, produce the same number of equally-spaced output pulses during the equal time delays of delays 116 and 214 in FIGS. 5 and 6, respectively.

Bistable multivibrator 216 controls the operation of the shift registers 230, 232, 234, and 236, via conventional AND gates 222, 224, 226, and 228, respectively. In particular, the "set" output of the bistable multivibrator 216 is connected to first inputs of AND gates 224 and 226, and to a second input of AND gate 231. The "reset" output of the bistable multivibrator 216 is connected to first inputs of AND gates 222 and 228, and to a second input of AND gate 229. Second inputs to AND gates 222 and 226 are connected to the output of frequency divider 220. Second inputs to AND gates 224 and 228 are connected to the output of comparator 102. In the "-set" state of the bistable multivibrator 216 AND gates 224 and 226 are enabled, allowing the pulse outputs of comparator 102 and frequency divider 220 to advance shift registers 232 and 234, respectively. In the "reset" state of the bistable multivibrator 216 AND gates 222 and 228 are enabled, allowing the pulse outputs of frequency divider 220 and comparator 102 to advance shift registers 230 and 236, respectively.

The output of frequency divider 220 is also connected to a control input of the analog-to-digital converter 84. Responsive to each output pulse of the frequency divider 220, analog-to-digital converter 84 converts the magnitude of its input voltage into a binary word of M digits which is placed into an output register (not shown), comprising M ordered binary stages, of the analog-to-digital converter. The binary outputs of the M stages of the analog-to-digital converter output register are connected in parallel, via transfer gates (not shown), to the inputs of 2N conventional M-stage binary registers illustrated by a dashed block having reference numeral 88. Functionally, the 2N registers 88 are divided into a first set of N registers (registers 1 through N) and a second set of N registers (registers (N+1) through 2N). The set output of each stage of the N ordered binary stages of the shift register 230 is connected to the transfer gates (not shown) interconnecting the analog-to-digital output register (not shown) and the first set of N registers of registers 88 having the same order. Similarly, the set output of each stage of the N ordered binary stages of the shift register 234 is connected to the transfer gates (not shown) interconnecting the analog-to-digital output register (not shown) and the second set of N registers of registers 88 having the same order. Thus, for example, the lowest order stage (bit 1) of the shift register 230, when triggered to the set state, gates the contents of the analog-to-digital output register into the first register 238 of the first N registers 88, the lowest order stage (bit N+1) of the shift register 234, when triggered to the "set" state, gates the contents of the analog-to-digital output register into the first register of second set of N register 88, and the highest order stage (bit 2N) of the shift register 234, when triggered to the "set" state, gates the contents of the analog-to-digital output register into the highest order register 240 of the second set of N registers 88.

The M "set" outputs of each binary register of the 2N ordered registers 88 are connected to first inputs of a set of M AND gates having the same order of 2NM ordered AND gates illustrated by a dashed block having reference numeral 242. The "set" output of each binary stages of the N ordered stages of the shift register 232 is connected to second inputs of a set of M AND gates having the same order of 2NM AND gates 242. Similarly, the "set" output of each binary stage of the N ordered stages of the shift register 236 is connected to second inputs of a set of M AND gates having the same order of AND gates 242. Thus, for example, the "set" output of the lowest order stage (bit 1) of the shift register 232 is connected to the first set of M gates, the "set" output of the highest order stage (bit 2N) of the shift register 236 is connected to the highest order set of of M gates. Each AND of the AND gates 242 is fully enabled and produces an output when the register stage and the shift register stage to which it is connected are both in the "set" state.

The output of AND gates 242, connected to the same order stages of the registers 88, are connected to the input of a common OR gate of M OR gates illustrated by a dashed block having reference numeral 252.

The M outputs of the OR gates 252 are connected to a first set of M inputs of a conventional comparator 102. A second set of M inputs of comparator 102 is connected to the "set" outputs of M-stage counter 96. Comparator 102 produces an output pulse when the two binary numbers represented by the first and second set of M inputs are equal. The output of the comparator 102 is connected to the display 104 for controlling the unblanking circuit of the display.

Before operation of the decoder, delays 212 and 214 are adjusted to provide the appropriate time delay as described hereinbefore, and the frequency divider 220 is adjusted to produce the same number of equally-spaced output pulses (N in the present case) as the frequency divider 120 in FIG. 5.

In operation of the decoder, and assuming that the bistable multivibrator 216 is in the "reset" state, a synchronization pulse on line 82 passes sync separator 210, clears all binary stages of the shift registers 230 and 234 and the counter 96, triggers the delay 212, toggles the bistable multivibrator 216 to the "set" state, and positions display 104 to the next display line. The delayed output of delay 212 triggers delay 214 and passes through enabled AND gate 231 to set the lowest order stage (bit 1) of the shift register 232 to the "set" state.

During the time delay of delay 214, AND gate 218 passes clock pulses from the clock 94 to frequency divider 220 and counter 96. Assuming that encoded video information has been inserted in the first N registers of registers 88 during the previously transmitted television scan, the first M AND gates connected to the first register 238 pass the contents of the first register 238 to the comparator 102 via OR gates 252. When the contents of the counter 96 equals the contents of register 238, comparator 102 produces an output pulse which is coupled to the shift input of shift register 232, via AND gate 224, thereby shifting the binary "one" into the second stage (bit 2) of the shift register 232. The second register of registers 88 is now connected to the comparator 102 via the second set of M AND gates of AND gates 242 and OR gates 252. Upon equality between the contents of the second register of registers 88 and the contents of continuously advancing counter 96, comparator 102 again produces an output pulse which shifts the shift register 232 so as to enable the comparison of the next register of register 88 with the counter 96. Each output pulse of comparator 102 also unblanks the display 104 thereby plotting a point on the screen of the display, indicating a point of a line of the transmitted line drawing.

During the decoding and display of the video information in the first N registers of registers 88, the incoming video information of the next television scan being transmitted is converted by the analog-to-digital converter 84 and stored in successive registers of the second set of N registers of registers 88. The first output pulse of the frequency divider signals the analog-to-digital converter 84 to convert the current input voltage level into a binary output word and sets the lowest order stage (bit N + 1) of the shift register 234 to the "set" state, via AND gate 226. The set output of the lowest order stage of the shift register 234 gates the analog-to-digital binary output into the first register of the second set of N registers of registers 88. Similarly, successive output pulses of frequency divider 220 convert and store successive incoming voltage levels into successive registers of the second set of N registers.

After the delay time of delay 214, which, as noted hereinbefore, is the same as the time to horizontally scan across the line drawing to be transmitted, AND gate 218 is disabled by delay 214 thereby terminating output pulses of frequency divider 220.

The next synchronization pulse on line 82, toggles the bistable multivibrator 216 to the "reset" state thereby enabling AND gates 222 and 228. The contents of the second set of N registers of registers 88 are now decoded and displayed under control of shift register 236, while the first set of N registers of registers 88 receive and store successive analog-to-digital output words under control of shift register 230.

Again, the decoder may be modified to receive and decode voltage levels encoded according to the representation illustrated in FIG. 2, by connecting the output of comparator 102 to a clear input of counter 96. The output pulse of comparator 102 clears counter 96 after a comparison, thus starting the counter from the count of zero for the next comparison in accordance with the representation illustrated in FIG. 2.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

We claim:

1. A method of transmitting the optical image of a line drawing, comprising:
- scanning said image along a predetermined number of horizontal scans;
- converting the time interval between successive intersections of a horizontal scan and lines of the line drawing into a voltage level proportional thereto;
- transmitting said voltage levels at a predetermined rate; and
- converting said transmitted voltage levels into the corresponding image of said line drawing.

2. A method of transmitting the optical image of a line drawing, comprising:
- scanning said image along a predetermined number of horizontal scans,
- converting the time intervals between the beginning of a scan and intersections of a scan with the lines of said line drawing into voltage levels proportional thereto;
- transmitting said voltage levels at a predetermined rate; and
- converting said transmitted voltage levels into the corresponding image of said line drawing.

3. An apparatus for transmitting line drawings, comprising:
- means for scanning the optical image of said line drawing along a predetermined number of horizontal scans;
- means responsive to successive video pulses produced in response to the intersection of a scan and a line of said line drawing for converting the time interval between said successive video pulses into binary numbers representative thereof;
- means for converting said binary numbers into representative voltage levels having controllable time durations;
- means for transmitting said voltage levels; and
- means for decoding said transmitted voltage levels into the corresponding time intervals.

4. The apparatus according to claim 3, wherein said means for converting said time intervals comprises:
- register means including a plurality of binary stages each having a set output;
- a source of clock pulses; and
- a plurality of counter means, each of said counter means including a gated input connected to the output of said source of clock pulses and the set output of one of said binary stages for advancing each of said counter means only in response to time coincidence between the set state of the binary stage connected thereto and the output of said source of clock pulses.

5. The apparatus according to claim 3 wherein said means for converting said binary numbers into representative voltage levels having controllable time durations comprises:

a source of clock pulses;

adjustable frequency divider means having its input connected to said clock pulses for producing a predetermined number of equally-spaced output pulses within the time required to make one of said horizontal scans;

a plurality of register means for storing said binary numbers;

digital-to-analog conversion means for converting an input binary word into an output voltage representative thereof in response to an output pulse of said frequency divider means;

a plurality of gating means having first inputs thereof connected to binary outputs of said binary registers and having outputs thereof connected to the input of said conversion means; and binary shift register means for shifting a binary one in response to the output pulses of said frequency divider means and including a plurality of binary outputs connected to second inputs of said gating means for sequentially gating said stored binary numbers to the input of said conversion means in response to said binary one.

6. The apparatus according to claim 3, wherein said means for decoding comprises:

a source of clock pulses;

adjustable frequency divider means having its input connected to said clock pulses for producing a predetermined number of equally-spaced output pulses within the time to make one of said horizontal scans;

analog-to-digital conversion means for converting an input voltage into a binary output representative thereof in response to an output pulse of said frequency divider;

means for applying said transmitted voltage levels to the input of said conversion means;

counter means receiving said clock pulses during the time required to make one of said horizontal scans and including a binary output; and comparison means receiving the binary outputs of said conversion means and said counter means for producing an output pulse in response to equality therebetween.